(No Model.) 2 Sheets—Sheet 2.
T. PAQUETTE & F. R. CHILD.
HUB BORING MACHINE.
No. 449,494. Patented Mar. 31, 1891.
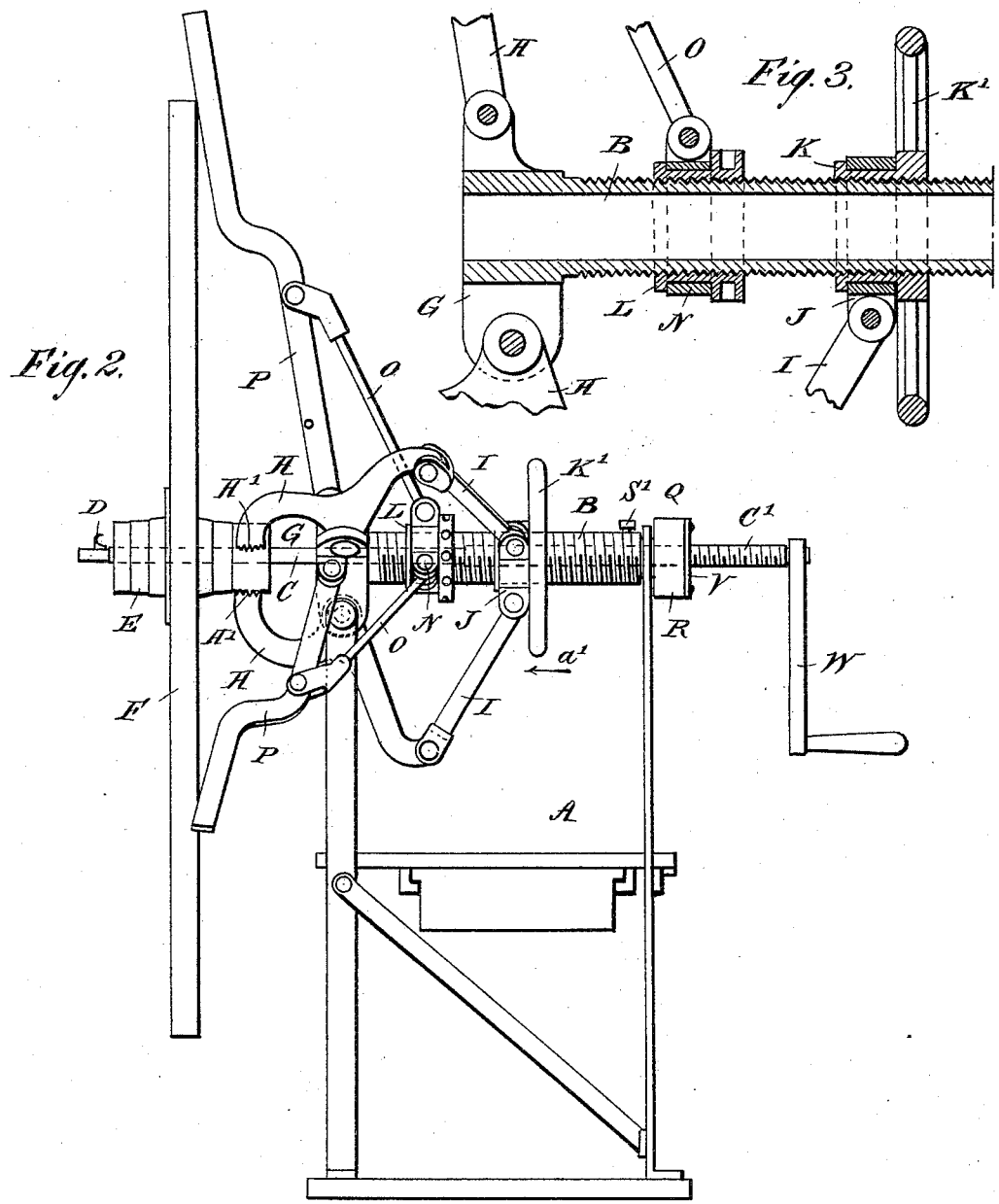
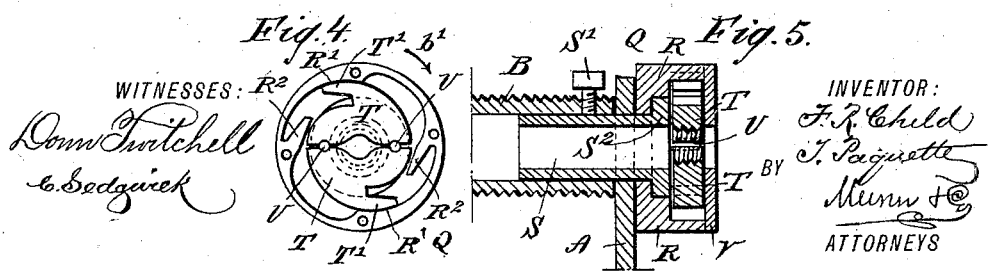
WITNESSES:
Donn Twitchell
C. Sedgwick
INVENTOR:
F. R. Child
T. Paquette
BY Munn & Co.
ATTORNEYS

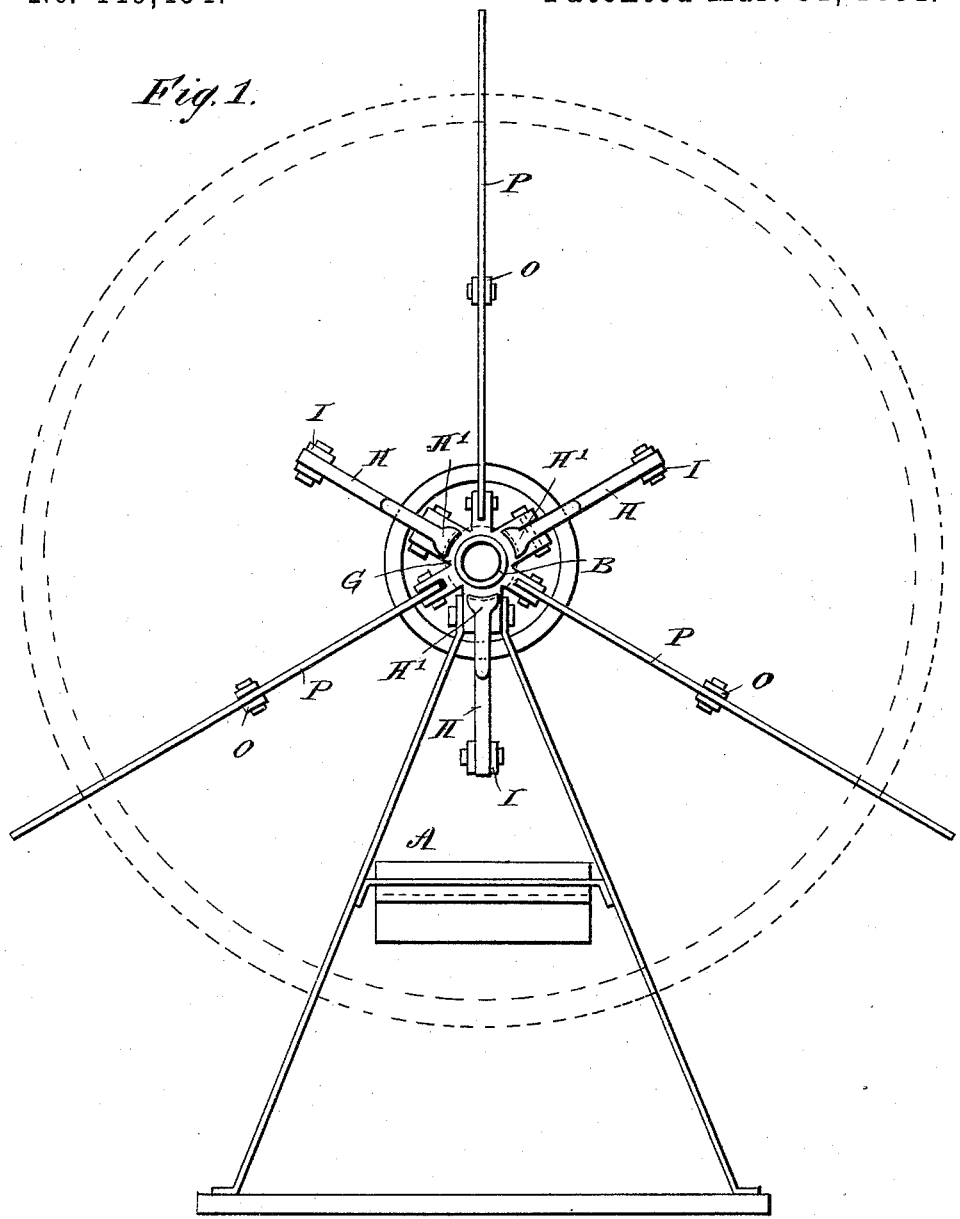

UNITED STATES PATENT OFFICE.

THEOPHILE PAQUETTE AND FREDERICK R. CHILD, OF WEBSTER, MASSACHUSETTS.

HUB-BORING MACHINE.

SPECIFICATION forming part of Letters Patent No. 449,494, dated March 31, 1891.

Application filed July 5, 1890. Serial No. 357,828. (No model.)

*To all whom it may concern:*

Be it known that we, THEOPHILE PAQUETTE and FREDERICK R. CHILD, of Webster, in the county of Worcester and State of Massachusetts, have invented a new and Improved Hub-Boring Machine, of which the following is a full, clear, and exact description.

The object of the invention is to provide a new and improved hub-boring machine which is simple and durable in construction, very effective in operation, and specially designed to quickly, conveniently, and accurately bore the hub of a wheel.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a face view of the improvement. Fig. 2 is a side elevation of the same. Fig. 3 is an enlarged sectional side elevation of part of the threaded tube and adjacent parts. Fig. 4 is a face view of the locking-nut, and Fig. 5 is a sectional side elevation of the same and adjacent parts.

The improved hub-boring machine is provided with a suitably-constructed frame A, in the upper part of which is held a threaded tube B, through which is adapted to pass the shaft C, carrying near its outer end a suitable cutting-tool D for boring the aperture in the hub E of the wheel F. On the outer end of the tube B is formed or secured a head G, provided with two sets of lugs, on one set of which are pivoted the levers H, formed on their outer ends with jaws H', adapted to engage the inner end of the hub E of the wheel F. The rear ends of the levers H are pivotally connected by links I with lugs formed on a ring J, mounted to turn loosely on a nut K, screwing on the thread of the tube B and provided with a hand-wheel K' for conveniently turning the said nut K to screw the latter forward or backward on the threaded tube B. When the hand-wheel K' is turned so as to move the nut K forward in the direction of the arrow $a'$, then the links I, connected with the levers H, cause the latter to swing, whereby the jaws H' move toward each other and close onto the hub E, thus holding the wheel F in place. When the hand-wheel K' is turned in an opposite direction, the nut K moves rearward in the inverse direction of the arrow $a'$, carrying with it the ring J, so that the links I swing the levers H in an opposite direction and the jaws H' open and disengage the hub of the wheel. A second nut L, similar to the nut K, also screws on the tube B in front of the nut K, and on the said nut L is held loosely a ring N, having lugs pivotally connected with links O, pivoted on arms P, fulcrumed on the second set of lugs on the head G. The arms P are adapted to engage the inner face of the wheel F, so as to hold the latter in proper position—that is, at right angles to the tube B—in order to permit the tool D to bore the hole in the hub E accurately when the shaft C is turned, as hereinafter more fully described. The nut L acts on the arms P similarly to the nut K on the levers H—that is, when the nut L is moved outward the pivoted arms P swing outward to engage the face of the wheel, and when the said nut L is turned to move rearward then the said pivoted arms P swing away from the face of the wheel to disengage the latter. The inner end of the shaft C screws in a nut Q, held on the rear end of the tube B. The nut Q is preferably of the construction shown in Figs. 4 and 5 and arranged in such a manner that the shaft C can be readily placed in the nut or removed from the same whenever desired. The threaded end C' of the shaft C screws in this nut, which is arranged as follows: The nut is provided with a casing R, mounted to turn loosely on the flanged end of the short pipe S, passing through a standard of the frame A into the inner end of the tube B, and is secured thereon by a set-screw S'. In the casing R in front of the flange $S^2$ of the pipe S are arranged two jaws T, provided with opposite threads adapted to engage the threaded end C' of the shaft C. Each of the jaws T is provided with a cam-arm T', the outer surfaces of which are adapted to engage a cam R', formed on the inside of the casing R, while the inside of the said cam-arm T' is adapted to engage a projection $R^2$, formed in the said casing, and as is plainly illustrated in Fig. 4.

The two jaws T are adapted to swing from pins U as a fulcrum, the said pins being secured in the flange $S^2$ of the stationary pipe S. When the two jaws T are in a closed position, as illustrated in Fig. 4, their threads engage the threaded end C' of the shaft C, so that when the latter is turned the shaft screws forward and backward, according to the direction in which the said shaft is turned. When the operator desires to disengage the shaft C from the nut Q, he turns the casing R in the direction of the arrow $b'$, (see Fig. 4,) so that the inside of the cam-arms T' are engaged by the arms $R^2$, whereby the cams swing outward on their respective pins U, so that the interior threads of the jaws disengage the thread C' of the shaft, and the latter can be conveniently slipped out of the tube and nut Q.

When the operator desires to bore a hole in the hub E of the wheel F, he first moves the levers H by manipulating the hand-wheel K' so that the jaws H' are opened. He also manipulates the nut L so that the arms P are in an open position. The wheel F is then placed on the machine, the inner end of the hub passing into the jaws H', the operator at the same time turning the hand-wheel K' to close the jaws H' onto the said hub to hold the wheel in place. The operator then manipulates the nut L so that the arms P swing outward against the face of the wheel F, so that the latter stands true and is prevented from wabbling. The shaft C is then inserted into the open jaws T of the nut Q until the outer end of the shaft, with the cutting-tool D, projects through the front end of the tube B. The threaded part C' of the said shaft is then in the jaws T, so that the operator in turning the casing R in the inverse direction of the arrow $b'$ causes the cams R' of the said casing to press onto the cam-arms T', so that the latter swing inward from their respective pins U and engage the threaded part C' of the shaft C. The operator then turns the crank-arm W on the shaft C, whereby the latter is fed forward, and the cutting-tool D can bore the hub E of the wheel F. When the opening has been formed in the hub, the shaft C can be quickly removed into its former position by opening the jaws T, as previously described, and drawing the shaft backward. The wheel is then removed by opening the levers H. A new wheel may then be inserted and the above-described operation repeated.

Having thus fully described my invention, I claim as new and desire to secure by Letters Patent—

1. The combination, with a boring-tool and a stationary externally-threaded tube, of alternating jaws and arms pivoted thereon, two nuts on said tube provided with loose bands or collars, and links connecting the jaws and arms with the respective collars, substantially as set forth.

2. The combination, with the frame, the stationary externally-threaded tube mounted therein, and clamping-jaws pivoted to the front end of the tube and having an operating-nut traveling on said tube, of a nut and a screw-threaded boring-tool spindle passed through the nut and tube, substantially as set forth.

3. In a hub-boring machine, the combination, with a threaded tube, of arms pivoted to one outer end of the said tube and adapted to engage the face of the wheel, links pivotally connected with the said arms, a ring pivotally connected with the said links, and a nut adapted to screw on the said threaded tube and carrying the said ring, substantially as shown and described.

4. The combination, with the tube S, having the parallel longitudinally-projecting pins U on one end, of the two jaws or nut-sections T, between the adjacent edges of which the said two pins project, and the cam-arms T' on the peripheries of said jaws and lying in the planes thereof, the rotary casing R, turning on said tube and having internal cam-surfaces R' to operate on the outer surfaces of cam-arms T', and intermediate projections $R^2$ to engage the inner surfaces of said cam-arms, substantially as set forth.

5. A hub-boring machine comprising the frame A, the externally-threaded tube mounted between the frame-uprights, the short tube S, extending into inner end of the tube and provided with an annular flange on its outer end, the clamping jaws and arms pivoted on the outer end of the screw-threaded tube and the operating-nuts, the expansible nut comprising a casing R, turning on the flange S and having internal cams R' and projections $R^2$ and the jaws or nut-sections T within the casing R, and having peripheral cam-arms T', substantially as set forth.

THEOPHILE PAQUETTE.
FREDERICK R. CHILD.

Witnesses:
MOSES MOREAU,
H. J. CLARK.